May 28, 1935. K. STROBEL 2,003,019
METHOD OF PROTECTIVELY FACING SURFACES WITH ABRASION RESISTING MATERIAL
Filed Sept. 16, 1930
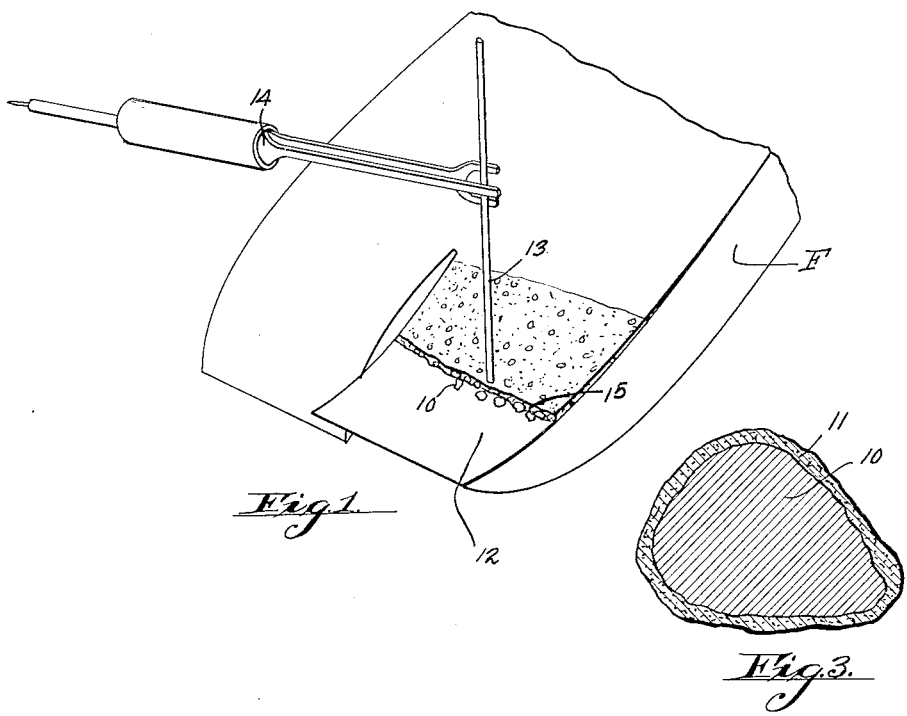
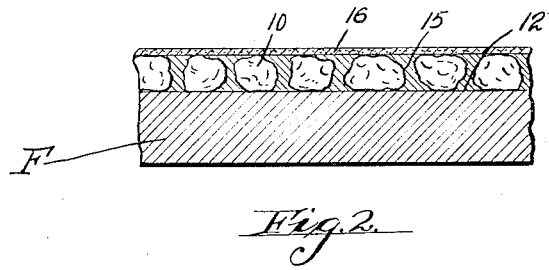

Patented May 28, 1935

2,003,019

UNITED STATES PATENT OFFICE 2,003,019

METHOD OF PROTECTIVELY FACING SURFACES WITH ABRASION RESISTING MATERIAL

Karl Strobel, Whittier, Calif., assignor to Stoody Company, Whittier, Calif., a corporation of California Application September 16, 1930, Serial No. 482,270

9 Claims. (Cl. 219—10)

This invention relates to an improved method of protectively facing surfaces with abrasion resisting material. It has heretofore been customary to apply pieces of an abrasion resisting material to surfaces by welding on added metal which surrounds the pieces of abrasion resisting material and fastens them or anchors them to the parent metal. An abrasion resisting material which has been used in large quantities for this purpose during recent years consists of pieces or fragments of tungsten carbide or alloys consisting principally of tungsten carbide. These pieces have been welded on to the cutting edges of bits and other tools by welding on added metal with an acetylene torch. Usually mild steel is employed to anchor the pieces of tungsten carbide in place and thereafter a layer of hard facing material is welded over the mild steel layer in which the pieces of tungsten carbide are embedded.

It has long been desired to be able to weld on the pieces of abrasion resisting material with an electric arc but it has heretofore been regarded as impracticable or impossible because the arc had the effect of breaking up the pieces of tungsten carbide or alloy and melting them in the pool of steel surrounding the pieces. Although the melting of the tungsten carbide or alloy would be relatively small, yet it was sufficiently rapid to materially reduce the size of the tungsten carbide during the welding.

A difficulty which has been encountered in welding on abrasion resisting materials, such as tungsten carbide or alloys consisting principally of tungsten carbide, with either an electric arc or an acetylene torch resided in the fact that the tungsten carbide quickly oxidized at high temperatures. The oxide which quickly formed when an electric arc was employed poisoned the added on metal and prevented a strong adhesive bond being formed between the mild steel and the surface of the abrasion resisting material. This formation of the oxide was not so readily noticed where a neutral acetylene frame was employed and as the acetylene welding flame did not develop a sufficient heat to melt the tungsten carbide, the acetylene process was the only process heretofore considered practical.

It is an object of this invention to provide an improved method for welding on abrasion resisting materials to surfaces to be protected thereby which is of such a nature as to enable the pieces of abrasion resisting material to be welded on with either an acetylene welding torch or an electric arc.

Another object of the invention is to provide a new method of protectively facing surfaces with an abrasion resisting material which will effectively prevent the formation of oxide on the exterior surface of the abrasion resisting material, thus preventing the poisoning of the added on metal and enabling the strong adhesive bond to be formed between the added metal and the surface of the abrasion resisting material.

Still another object of the invention is to provide a method wherein the pieces of abrasion resisting material or diamond substitute are welded on to the parent metal by the hard surfacing material. The improved method enables this to be satisfactorily accomplished, eliminating the use of mild steel to anchor the abrasion resisting material in place and a subsequent application of the hard facing.

With the foregoing and other objects in view, which will be made manifest in the following detailed description, and specifically pointed out in the appended claims, reference is had to the accompanying drawing for an illustrative embodiment of the invention, wherein:

Fig. 1 is a partial perspective view illustrating the method as being applied in protectively facing the edges of a fish tail well drilling bit.

Fig. 2 is a sectional view illustrating how the pieces of abrasion resisting material appear after having been applied by the improved method.

Fig. 3 is a sectional view through a piece of abrasion resisting material employed in the improved method.

Referring to the accompanying drawing, wherein similar reference characters designate similar parts throughout, I use pieces, one of which is indicated at 10, of any conventional abrasion resisting material. This is preferably tungsten carbide, but may be other forms of diamond substitute, and may even be diamonds. I coat the pieces with individual flux coatings, the coating being indicated by the reference character 11. Any suitable flux coating may be employed for this purpose although I have found that a flux coating consisting of about twenty-five percent lamp black and seventy-five percent calcium fluoride, held together by a sodium silicate binder, gives satisfactory results. The flux coating may be a non-metallic coating, as above described, or it may be a metallic coating and its effect may be to generate a reducing gas surrounding the piece of tungsten carbide or merely a protection against air contacting with the abrasive when heated. In applying the abrasion resisting material, pieces of the abrasion resisting material are positioned on the surface indicated at 12, such as that of a fish tail bit F, near the edge thereof. The added metal is supplied by a welding rod 13 which may be held in an electrode holder 14. It is considered, however, within the scope of the invention to use a welding pencil which will melt up the body of the surface 12 to anchor the pieces of abrasion resisting material in place. The welding is done by welding beads of added metal about the individual pieces of abrasion resisting material and when this is done by an electric arc process, as shown, the abrasion resisting material or tungsten carbide 10 is effectively protected. The flux generating its gas protects the abrasion resisting material from oxidation and also acts somewhat as a heat insulator, delaying the heating of the tungsten carbide so that it will not be melted under the intense heat of the electric arc. During the welding the flux melts and floats on top of the pool or bed of molten metal, thus leaving the submerged portions of the abrasion resisting material free and clean of any oxide, enabling a strong adhesive bond to be formed between the added metal 15 and the abrasion resisting material. This process is continued until the surface 12 is completely covered with the embedded pieces or fragments of the tungsten carbide or alloy on the desired surfaces or edges have been protectively faced. In the event that the welding rod 13 is a mild steel welding rod, the protective coating thus applied is preferably coated over with a subsequent layer of hard facing material 16 which may be a layer of welded on self hardening rod.

When an acetylene torch is employed it is not so essential that the flame of the torch be a strictly non-oxidizing flame for the flux 11 effectively protects the pieces of tungsten carbide or alloy from oxidation.

The flux coating 11 should have a melting point materially higher than that of mild steel and should approach closely the melting point of the abrasion resisting material 10. It does not have the effect of poisoning or injuring the surrounding metal and will float on top of the molten surrounding metal so that the flux does not remain in the welded deposit spacing the added on metal from the abrasion resisting material. While the improved method has been primarily designed to be used with either an acetylene torch or an electric arc, it may be used with an atomic hydrogen process as well, as the protective coating of flux sufficiently protects the abrasion resisting material from the heat of the arc so that it will not be melted thereby.

I am aware that it has been customary to coat electrodes and other parts to be fused with a flux but when a flux was thus employed its function was to facilitate melting or fusion. In the present case the function of the flux is to prevent melting and consequent fusion of the abrasion resisting material with the added on mild steel, also to prevent the oxidation of the abrasion resisting material and consequent poisoning of the added metal.

Various changes may be made in the details of construction without departing from the spirit or scope of the invention as defined by the appended claims.

I claim:

1. The method of providing protective surfaces in which there are diamond substitutes, which consists of coating pieces of diamond substitute with a coating which will delay the heating of the pieces of diamond substitute, and applying these coated pieces to the work by the application of welded on molten metal.

2. The method of providing protective surfaces in which there are diamond substitutes which consists of coating pieces of diamond substitute with a coating which will delay the heating of the pieces of diamond substitute, and applying these coated pieces to the work by the application of welded on molten metal, using the electric arc.

3. The method of providing protective surfaces in which there are diamond substitutes which consists of coating pieces of diamond substitute with a coating which will delay the heating of the pieces of diamond substitute, and applying these coated pieces to the work by the application of welded on molten metal, using the electric arc, and in so doing causing the coating to be largely removed from the pieces and allowing the deposited metal to cool and harden about the pieces to secure them in place.

4. The method of protecting surfaces with tungsten carbide pieces, which consists of coating the tungsten carbide pieces with a flux coating to retard the melting of the tungsten carbide pieces and applying these to the work by depositing and welding molten metal around them.

5. The method of protecting surfaces with tungsten carbide pieces, which consists of coating the tungsten carbide pieces with a flux coating to retard the melting of the tungsten carbide pieces and applying these to the work by welding molten metal around them, using the electric arc depositing and welding process.

6. The method of protecting surfaces with tungsten carbide pieces, which consists of coating the tungsten carbide pieces with a flux coating to retard the melting of the tungsten carbide pieces and applying these to the work by depositing and welding molten metal around them, using the electric arc welding process using a metallic electrode.

7. The method of protecting surfaces with tungsten carbide pieces, which consists of coating the tungsten carbide pieces with a flux coating to retard the melting of the tungsten carbide pieces and applying these to the work by depositing and welding molten metal around them, and in so doing causing the coating to be largely removed from the pieces and allowing the metal to cool and harden about the pieces to fasten them in place.

8. The method of protecting surfaces with tungsten carbide pieces, which consists of coating the tungsten carbide pieces with a flux coating to retard the melting of the tungsten carbide pieces and applying these to the work by depositing and welding molten metal around them, using the electric arc welding process, and in so doing causing the coating to be largely removed from the pieces and allowing the metal to cool and harden about the pieces to fasten them in place.

9. The method of protecting surfaces with tungsten carbide pieces, which consists of coating the tungsten carbide pieces with a flux coating to retard the melting of the tungsten carbide pieces and applying these to the work by depositing welding molten metal around them, using the electric arc welding process using a metallic electrode, and in so doing causing the coating to be largely removed from the pieces and allowing the metal to cool and harden about the pieces to fasten them in place.

KARL STROBEL.